United States Patent Office 3,023,206
Patented Feb. 27, 1962

3,023,206
PROCESS FOR INTRODUCING Δ¹ UNSATURATION INTO STEROIDS
Derek Burn, David Neville Kirk, Vladimir Petrow, and George Oliver Weston, all of London, England, assignors to The British Drug Houses Limited, London, England, a British company
No Drawing. Filed Mar. 11, 1959, Ser. No. 798,609
Claims priority, application Great Britain Mar. 13, 1958
12 Claims. (Cl. 260—239.55)

This invention is for improvements in or relating to organic compounds and has particular reference to the 1-dehydro derivatives of certain unsaturated steroidal 3-ketones.

Steroids possessing the 3-oxo-$\Delta^{1:4}$- and 3-oxo-$\Delta^{1:4:6}$- systems are of particular value on account of their biological properties which are often considerably enhanced in relation to those of the corresponding 3-oxo-$\Delta^{4}$- and 3-oxo-$\Delta^{4:6}$- analogues.

Such 1-dehydro steroids have been previously prepared by one of the following procedures.

The corresponding 3-oxo-$\Delta^{4}$-steroid may be oxidised with selenium dioxide, or it may be converted into a halogenated derivative which is then dehydrohalogenated to yield the required 1-dehydro analogue. These processes are in general unsatisfactory due to the difficulty in carrying out the reactions and the low yields obtainable. In addition, 1-dehydro steroids may also be prepared by microbiological dehydrogenation of a suitable precursor, which process is however expensive to carry out and requires specialised equipment and techniques.

We have now found that 3-oxo-$\Delta^{4}$- and 3-oxo-$\Delta^{4:6}$- steroids may be converted in excellent yields into the corresponding 1-dehydro analogues by a simple, one-stage chemical process.

It is also an object of the invention to provide certain new 1-dehydro steroids which are of value on account of their biological properties or as intermediates in the preparation of compounds having useful biological properties as is apparent to those skilled in the art.

According to the present invention there is provided a process for the preparation of 3-oxo-$\Delta^{1:4}$- and 3-oxo-$\Delta^{1:4:6}$- steroids having the formula

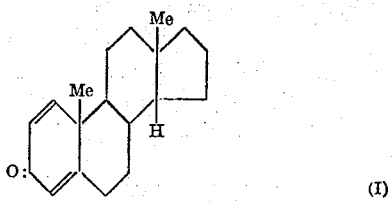

(I)

(with or without a double bond at the 6:7 position) which process comprises treating the corresponding 3-oxo-$\Delta^{4}$- or 3-oxo-$\Delta^{4:6}$-steroids having the formula

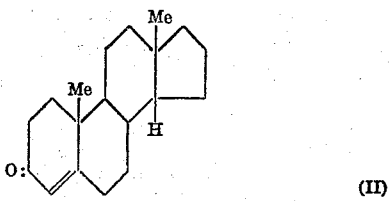

(II)

(with or without a double bond at the 6:7 position) with 2:3-dicyano-1:4-benzoquinone, which may be additionally substituted with one or two chlorine atoms, in a solvent.

Preferably 2:3 - dicyano - 5:6 - dichloro - 1:4 - benzoquinone is employed. (See J.C.S., 1954, 3569, for the preparation of these two quinones.)

The solvent may be benzene, dioxan, dimethylene glycol dimethyl ether, chlorobenzene, dimethylformamide, nitrobenzene, acetic acid or propyl acetate. The dehydrogenation reaction is preferably carried out at an elevated temperature and conveniently between 80° C. and 110° C. Theoretically the reaction is best performed in an inert atmosphere such as for example nitrogen, but this precaution has little practical significance in the majority of cases herein. The rate of reaction may be increased by the addition of a catalytic amount of a proton donor, and in particular by the addition of a catalytic amount of p-nitrophenol. Completion of the reaction is generally indicated by the discharge of the colour of the quinone and/or by the fact that further quantities of 2:3-dicyano-5:6-dichloro-1:4 - dihydroxy - benzene are no longer deposited from the hot reaction liquors. Alternatively, completion of the reaction may be determined by estimating the quantity of the quinone present in the reaction liquors by standard methods well known to those skilled in the art.

The 1-dehydro steroid derivative is isolated from the reaction liquor by any convenient procedure. Thus the reaction liquors may be filtered to remove the sparingly soluble hydroquinone, extracted with aqueous alkali to remove phenolic products, evaporated to dryness, under reduced pressure if desired, and the residual solids crystallised in the usual way. Other methods will be apparent to those skilled in the art.

The process of the invention is of wide applicability and may, in general, be applied to 3-oxo-$\Delta^{4}$ and 3-oxo-$\Delta^{4:6}$- derivatives of androstane, pregnane, stigmastane, cholestane and spirostane containing additional substituents which do not interfere with the process of the invention as hereinunder indicated.

Oxo groups, and in particular oxo groups in positions C–11, 17 and 20 (including 20-oxo-16-ene).

Hydroxy, alkoxy and acyloxy groups, and in particular hydroxy, alkoxy and acyloxy groups in positions C–6, 11, 16, 17, 20 and 21.

Fluoro groups, and in particular fluoro groups in position C–9.

Alkyl groups, and in particular alkyl groups containing up to 5 carbon atoms in positions C–2, 4, 16 and 17.

Vinyl groups and in particular vinyl groups at position C–17.

Ethynyl and substituted ethynyl groups containing up to 4 carbon atoms, and in particular such groups at position C–17.

The invention also provides the following new 1-dehydro steroid derivatives which are of value in steroid technology in the preparation of aromatic steroidal structures possessing useful biological properties or as intermediates in the preparation of 1-dehydro steroidal derivatives possessing useful biological properties.

Thus the 1:4:6 trienes can be converted into aromatic steroids by reaction in solution in acetic anhydride with toluene p-sulphonic acid. While 9α-fluoro-11β:17β-dihydroxy-17α-methylandrosta-1:4-dien-3-one is the 1-dehydro analogue of a known anabolic and androgenic agent and itself has those properties.

17α-ethynyl-17β-hydroxyandrosta-1:4:6-trien-3-one
17β-hydroxy-17α-methylandrosta-1:4:6-trien-3-one
Pregna-1:4:6-triene-3:20-dione
11α-hydroxypregna-1:4-diene-3:20-dione
Pregna-1:4-diene-3:11:20-trione
Pregna-1:4:6-triene-3:11:20-trione
Pregna-1:4:16-triene-3:20-dione
16α-methyl pregna-1:4-diene-3:20-dione
9α - fluoro - 11β - 17β-dihydroxy-17α-methylandrosta-1:4-dien-3-one
Ethyl 3-oxopregna-1:4:17(20)-trien-21-oate
20:20-ethylenedioxypregna-1:4-dien-3-one
Cholesta-1:4-diene-3:6-dione Acetonide of 16α:17α-dihydroxypregna-1:4-diene-3:20-dione
17β-acetoxy-2-methylandrosta-1:4-dien-3-one
Pregna-1:4:9(11)-triene-3:20-dione Following is a description by way of example of methods of carrying the invention into effect.

EXAMPLE 1

*17α-Hydroxypregn-1:4-Diene-3:20-Dione*

A solution of 17α-hydroxyprogesterone (0.25 g.), 2:3-dicyano-5:6-dichlorobenzoquinone (0.25 g.) and p-nitrophenol (0.05 g.) in dry benzene (5 ml.) was heated under reflux for 6 hours, by which time the colour due to the quinone was completely discharged. The solution was diluted with ether and the precipitated hydroquinone was removed by filtration. The filtrate was washed with 2N sodium hydroxide, water, dried over sodium sulphate and stirred with charcoal. Evaporation of the filtered extract under reduced pressure left a crystalline residue which on recrystallisation from chloroform/ethanol gave 17α-hydroxypregn-1:4-diene-3:20-dione as plates, M.P. 230 to 232° C., $[\alpha]_D^{22}+36°$ (c. 0.57 in chloroform), $\lambda_{max}$. 244 m$\mu$, log $\epsilon$ 4.12.

EXAMPLE 2

*21-Acetoxypregn-1:4-Diene-3:20-Dione*

A solution of 21-acetoxypregn-4-ene-3:20-dione (0.25 g.), 2:3-dicyano-5:6-dichlorobenzoquinone (0.25 g.) and p-nitrophenol (0.05 g.) in dry benzene (5 ml.) was heated under reflux for 5½ hours. The product was isolated as described in Example 1 and crystallised from aqueous methanol to give 21-acetoxypregn-1:4-diene-3:20-dione as needles, M.P. 204 to 207° C., $[\alpha]_D^{20}+137°$ (c. 0.82 in choloroform), $\lambda_{max}$. 244 m$\mu$, log $\epsilon$ 4.20.

EXAMPLE 3

*Pregn-1:4-Diene-3:20-Dione*

A solution of progesterone (0.2 g.), 2:3-dicyano-5:6-dichlorobenzoquinone (0.2 g.) and p-nitrophenol (0.02 g.) in dry benzene (5 ml.) was heated under reflux for 9 hours. The product was isolated as in Example 1 and crystallised from ether/hexane to give pregn-1:4-diene-3:20-dione as prisms, M.P. 151 to 153° C., $[\alpha]_D^{21}+125°$ (c. 0.6 in chloroform), $\lambda_{max}$. 244.5 m$\mu$, log $\epsilon$ 4.21.

EXAMPLE 4

*21-Acetoxy-17α-Hydroxypregn-1:4-Diene-3:11:20-Trione*

A solution of cortisone acetate (0.15 g.), 2:3-dicyano-5:6-dichlorobenzoquinone (0.15 g.) and p-nitrophenol (0.04 g.) in dry benzene (40 ml.) was heated under reflux for 37 hours. The product was isolated as in Example 1 and crystallised from acetone/hexane to give 21-acetoxy-17α-hydroxypregn-1:4-diene-3:11:20-trione as prisms, M.P. 227 to 230° C., $[\alpha]_D^{22}+182°$ (c. 0.4 in dioxan), $\lambda_{max}$. 238 m$\mu$, log $\epsilon$ 4.19.

EXAMPLE 5

*25D-Spirosta-1:4-Dien-3-one*

A solution of diosgenone (0.25 g.) (Marker, Tsukamoto and Turner, J.A.C.S., 1940, 62, 2525), 2:3-dicyano-5:6-dichlorobenzoquinone (0.25 g.) and p-nitrophenol (0.05 g.) in dry benzene (5 ml.) was heated under reflux for 15 hours. The product was isolated as in Example 1 and crystallised from aqueous methanol to give 25D-spirosta-1:4-dien-3-one as needles, M.P. 192 to 194° C., $[\alpha]_D^{24}-71°$ (c. 0.64 in chloroform), $\lambda_{max}$. 244.5 m$\mu$, log $\epsilon$ 4.18.

EXAMPLE 6

*17β-Propionoxyandrosta-1:4-Dien-3-one*

A solution of testosterone propionate (0.5 g.) and 2:3-dicyano-5:6-dichlorobenzoquinone (0.4 g.) in dry benzene (5 ml.) was heated under reflux for 5½ hours. The product was isolated as in Example 1 and crystallised from acetone/hexane to give 17β-propionoxyandrosta-1:4-dien-3-one as laths, M.P. 144 to 146° C., $[\alpha]_D^{20}+33°$ (c. 0.65 in chloroform), $\lambda_{max}$. 244 m$\mu$, log $\epsilon$ 4.20.

EXAMPLE 7

*17β-Hydroxyandrosta-1:4-Dien-3-one*

A solution of testosterone (0.25 g.) and 2:3-dycyano-5:6-dichlorobenzoquinone (0.25 g.) in dry benzene (5 ml.) was heated under reflux for 15 hours. The product was isolated as in Example 1 and crystallised from aqueous methanol to give 17β-hydroxyandrosta-1:4-dien-3-one as needles, M.P. 167 to 169° C., $[\alpha]_D^{21}+22°$ (c. 0.72 in chloroform), $\lambda_{max}$. 244.5 m$\mu$, log $\epsilon$ 4.18.

EXAMPLE 8

*17β-Hydroxy-17α-Methylandrosta-1:4-Dien-3-one*

A solution of 17β-hydroxy-17α-methylandrost-4-en-3-one (0.25 g.), 2:3-dicyano-5:6-dichlorobenzoquinone (0.25 g.) and p-nitrophenol (0.05 g.) in dry benzene (5 ml.) was heated under reflux for 4 hours. The product was isolated as in Example 1 and crystallised from aqueous acetone to give 17β-hydroxy-17α-methyl-androsta-1:4-dien-3-one as needles, M.P. 162 to 164° C., $[\alpha]_D^{20}+3°$ (c. 0.65 in chloroform), $\lambda_{max}$. 244.5 m$\mu$, log $\epsilon$ 4.19.

EXAMPLE 9

*Androst-1:4-Diene-3:20-Dione*

A solution of androst-4-ene-3:17-dione (0.25 g.), 2:3-dicyano-5:6-dichlorobenzoquinone (0.25 g.) and p-nitrophenol (0.05 g.) in dry benzene (5 ml.) was heated under reflux for 5 hours. The product was isolated as in Example 1 and crystallised from aqueous acetone to give androsta-1:4-diene-3:20-dione as needles, M.P. 137 to 139° C., $[\alpha]_D^{19}+117°$ (c. 0.42 in chloroform), $\lambda_{max}$. 244.5 m$\mu$, log $\epsilon$ 4.22.

EXAMPLE 10

*Cholest-1:4-Dien-3-one*

A solution of cholest-4-en-3-one (0.5 g.), 2:3-dicyano-5:6-dichlorobenzoquinone (0.5 g.) and p-nitrophenol (0.1 g.) in dry benzene (10 ml.) was heated under reflux for 28 hours. The product was isolated as in Example 1 and crystallised from ethanol to give cholesta-1:4-dien-3-one as prisms, M.P. 111 to 113° C., $[\alpha]_D^{20}+27°$ (c. 0.65 in chloroform), $\lambda_{max}$. 244 m$\mu$, log $\epsilon$ 4.20.

EXAMPLE 11

*Cholesta-1:4:6-Trien-3-one*

A solution of cholesta-4:6-dien-3-one (0.5 g.) (Wilds and Djerassi, J.A.C.S., 1946, 68, 1712), 2:3-dicyano-5:6-dichlorobenzoquinone (0.5 g.) and p-nitrophenol (0.1 g.) in dry benzene (10 ml.) was heated under reflux for 7 hours. The product was isolated as in Example 1 and crystallised from ethanol to give cholesta-1:4:6-trien-3-one as prisms, M.P. 83 to 84° C., $[\alpha]_D^{20}+1°$ (c. 0.42 in chloroform), $\lambda_{max}$. 224 m$\mu$ (log $\epsilon$ 4.06), 256 m$\mu$ (log $\epsilon$ 4.01) and 300 m$\mu$ (log $\epsilon$ 4.07).

EXAMPLE 12

*11α-Hydroxypregna-1:4-Diene-3:20-Dione*

A solution of 11α-hydroxypregn-4-ene-3:20-dione (1 g.), 2:3-dicyano-5:6-dichlorobenzoquinone (1 g.) and p-nitrophenol (0.1 g.) in dry benzene (20 ml.) was heated under reflux for 6 hours. The product was isolated as in Example 1 and crystallised from aqueous methanol to give 11α-hydroxypregna-1:4-diene-3:20-dione as needles, M.P. 223 to 225° C., $[\alpha]_D^{18}+100.3°$ (c. 0.68 in chloroform), $\lambda_{max}$. 247 m$\mu$, log $\epsilon$ 4.25.

EXAMPLE 13

*Pregna-1:4-Diene-3:11:20-Trione*

A solution of pregn-4-ene-3:11:20-trione (1 g.), 2:3- dicyano-5:6-dichlorobenzoquinone (1 g.) and p-nitrophenol (0.1 g.) in dry benzene (20 ml.) was heated under reflux for 7 hours. The product was isolated as in Example 1 and crystallised from aqueous methanol to give pregna-1:4-diene-3:11:20-trione as needles, M.P. 167 to 169° C., $[\alpha]_D^{19}+249°$ (c. 0.9 in chloroform), $\lambda_{max.}$ 238.5 m$\mu$, log $\epsilon$ 4.12, $\nu_{max.}$ 1702, 1661, 1620, 1602 cm.$^{-1}$.

EXAMPLE 14

17β-Hydroxyandrosta-1:4:6-Trien-3-one

A solution of 17β-hydroxyandrosta-4:6-dien-3-one (0.53 g.) (Inhoffen and Zuehlsdorff, Ber., 1943, 76, 233), 2:3-dicyano-5:6-dichlorobenzoquinone (0.5 g.) and p-nitrophenol (0.05 g.) in dry benzene (10 ml.) was heated under reflux for 7½ hours. The product was isolated as in Example 1 and crystallised from aqueous acetone to give 17β-hydroxyandrosta-1:4:6-trien-3-one as needles, M.P. 155 to 156° C., $[\alpha]_D^{20}+16.5°$ (c. 0.32 in chloroform), $\lambda_{max.}$ 224 m$\mu$ (log $\epsilon$ 4.15), 257 m$\mu$ (log $\epsilon$ 4.17) and 298 m$\mu$ (log $\epsilon$ 4.16).

EXAMPLE 15

25D-Spirosta-1:4:6-Trien-3-one

A solution of 25D-spirosta-4:6-dien-3-one (0.56 g.) (Marker and Turner, J.A.C.S., 1941, 63, 767) and 2:3-dicyano-5:6-dichlorobenzoquinone (0.55 g.) in dry benzene (10 ml.) was heated under reflux for 10 hours. The product was isolated as in Example 1 and crystallised from dichloromethane/methanol to give 25D-spirosta-1:4:6-trien-3-one as needles, M.P. 209 to 211° C., $[\alpha]_D^{21}-101°$ (c. 0.29 in chloroform), $\lambda_{max.}$ 223 m$\mu$ (log $\epsilon$ 4.10), 255 m$\mu$ (log $\epsilon$ 4.07) and 299 m$\mu$ (log $\epsilon$ 4.13).

EXAMPLE 16

Pregna-1:4:6-Triene-3:20-Dione

A solution of pregna-4:6-diene-3:20-dione (1.5 g.) (Wettstein, Helv. Chim. Acta, 1940, 23, 388), 2:3-dicyano-5:6-dichlorobenzoquinone (1.5 g.) and p-nitrophenol (0.15 g.) in dry benzene (30 ml.) was heated under reflux for 7½ hours. The product was isolated as in Example 1 and crystallised from aqeous methanol to give pregna-1:4:6-triene-3:20-dione as prisms, M.P. 150 to 152° C., $[\alpha]_D^{17}+125.1°$ (c. 1.0 in chloroform), $\lambda_{max.}$ 222.5 m$\mu$ (log $\epsilon$ 4.06), 255.5 m$\mu$ (log $\epsilon$ 3.98) and 299.5 m$\mu$ (log $\epsilon$ 4.10).

EXAMPLE 17

17β-Hydroxy-17α-Methylandrosta-1:4:6-Trien-3-one

A solution of 17β-hydroxy-17α-methylandrosta-4:6-dien-3-one (1 g.) and 2:3-dicyano-5:6-dichlorobenzoquinone (1 g.) in dry benzene (20 ml.) was heated under reflux for 12 hours. The product was isolated as in Example 1 and crystallised from aqueous methanol to give 17β-hydroxy - 17α - methylandrosta - 1:4:6 - trien-3-one as laths, M.P. 139 to 140° C., $[\alpha]_D^{22}-19.15°$ (c. 1.0 chloroform), $\lambda_{max.}$ 223 m$\mu$ (log $\epsilon$ 4.05), 256.5 m$\mu$ (log $\epsilon$ 3.96) and 299 m$\mu$ (log $\epsilon$ 4.11).

EXAMPLE 18

Pregna-1:4:6-Triene-3:11:20-Trione

A solution of pregna-4:6-diene-3:11:20-trione (1 g.) (prepared from pregn-4-ene-3,11,20-trione by reaction with chloranil in the manner well-known to the art) and 2:3-dicyano-5:6-dichlorobenzoquinone (1 g.) in dry benzene (20 ml.) was heated under reflux for 14½ hours. The product was isolated as in Example 1 and crystallised from aqueous methanol to give pregna-1:4:6-triene-3:11:20-trione as needles, M.P. 177 to 179° C., $[\alpha]_D^{23}+350.1°$ (c. 1.05 in chloroform), $\lambda_{max.}$ 225m$\mu$ (log $\epsilon$ 4.01), 254.5 m$\mu$ (log $\epsilon$ 3.98) and 296 m$\mu$ (log $\epsilon$ 4.08).

EXAMPLE 19

11β:17α:21-Trihydroxypregna-1:4-Diene-3:20-Dione

A solution of 11β:17α:21-trihydroxypregn-4-ene-3:20-dione (0.5 g.) and 2:3-dicyano-5:6-dichlorobenzoquinone (0.5 g.) in purified dioxan (6 ml.) was heated under reflux for 5 hours. The product was isolated as in Example 1 and crystallised from acetone/hexane to give 11β:17α:21-trihydroxypregna-1:4-diene-3:20-dione as a micro-crystalline powder, M.P. 236 to 240° C., $[\alpha]_D^{20}+100°$ (c. 0.22 in dioxan), $\lambda_{max.}$ 244 m$\mu$, log $\epsilon$ 4.15.

EXAMPLE 20

17α-Ethynyl-17β-Hydroxyandrosta-1:4-Dien-3-one

A solution of 17α-ethynyl-17β-hydroxyandrost-4-en-3-one (0.5 g.), 2:3-dicyano-5:6-dichlorobenzoquinone (0.5 g.) and p-nitrophenol (0.05 g.) in purified dioxan (10 ml.) was heated under reflux for 12½ hours. The product was isolated as in Example 1 and crystallised from chloroform/ethanol to give 17α-ethynyl-17β-hydroxyandrosta-1:4-dien-3-one as prisms, M.P. 225 to 228° C., $[\alpha]_D^{22}-13°$ (c. 0.7 in chloroform), $\lambda_{max.}$ 244 m$\mu$, log $\epsilon$ 4.2.

EXAMPLE 21

Pregna-1:4-Diene-3:20-Dione

A solution of progesterone (0.25 g.), 2:3-dicyanobenzoquinone (0.25 g.) and p-nitrophenol (0.05 g.) in dry benzene (5 ml.) was heated under reflux for 11 hours. The product was isolated as in Example 1 and crystallised from ether/hexane to give pregna-1:4-diene-3:20-dione as prisms, M.P. 150 to 152° C., $[\alpha]_D^{21}+126°$ (c. 0.45 in chloroform), $\lambda_{max.}$ 244 m$\mu$, log $\epsilon$ 4.21.

EXAMPLE 22

16α-Methylpregna-1:4-Diene-3:20-Dione

A solution of 16α-methylpregn-4-ene-3:20-dione (0.5 g.) (Marker and Crooks, J. Amer. Chem. Soc., 1942, 64, 1280), 2:3-dicyano - 5:6 - dichlorobenzoquinone (0.5 g.) and p-nitrophenol (0.05 g.) in dry benzene (10 ml.) was heated under reflux for 9½ hours. The product was isolated as in Example 1 and crystallised from ether/petroleum ether (B.P. 60 to 80° C.) to give 16α-methylpregna-1:4-diene-3:20-dione as blades, M.P. 129 to 133° C., $[\alpha]_D^{23}+120.8°$ (c. 0.18 in chloroform), $\lambda_{max.}$ 244 m$\mu$, log $\epsilon$ 4.24.

EXAMPLE 23

Pregna-1:4:16-Triene-3:20-Dione

A solution of pregna - 4:16 - diene-3:20 - dione (1 g.) (Butenandl and Schmidt-Thome, Ber., 1939, 72, 182), 2:3-dicyano-5:6-dichlorobenzoquinone (1 g.) and p-nitrophenol (0.1 g.) in dry benzene (20 ml.) was heated under reflux for 11½ hours. The product was isolated as in Example 1 and crystallised from dichlormethane/methanol to give pregna-1:4:16-triene - 3:20 - dione as plates, M.P. 208 to 211° C., $[\alpha]_D^{21}+120°$ (c. 0.46 in chloroform), $\lambda_{max.}$ 240 m$\mu$, log $\epsilon$ 4.31.

EXAMPLE 24

17α-Ethynyl-17β-Hydroxyandrosta-1:4:6-Trien-3one

A solution of 17α-ethynyl-17β-hydroxyandrosta-4:6-dien-3-one (1 g.) (prepared by treatment of 17α-ethynyl-17β-hydroxyandrost-4-en-3-one with chloranil in the manner well-known to those skilled in the art) and 2:3-dicyano-5:6-dichlorobenzoquinone (1 g.) in purified dioxan (15 ml.) was heated under reflux for 7½ hours. The product was isolated as in Example 1 and crystallized from dichloromethane/methanol to give 17α - ethynyl-17β - hydroxyandrosta-1:4:6-trien-3-one as prisms, M.P. 233 to 235° C., $[\alpha]_D^{23}-104.2°$ (c. 1.0 in chloroform), $\lambda_{max.}$ 255 m$\mu$ (log $\epsilon$ 3.93), 254 m$\mu$ (log $\epsilon$ 3.92) and 296 m$\mu$ (log $\epsilon$ 3.97).

EXAMPLE 25

21-Acetoxy-17α-Hydroxypregna-1:4:6-Triene-3:11:20-Trione

A solution of 21 - acetoxy - 17α - hydroxypregna-4:6-diene-3:11:20-trione (0.2 g.) (Mattox, Woroch, Fleisher and Kendall, J. Biol. Chem., 1952, 197, 261) and 2:3-dicyano - 5:6 - dichlorobenzoquinone (0.2 g.) in purified dioxan (5 ml.) was heated under reflux for 22½ hours. The product was isolated as in Example 1 and crystallised from acetone/hexane to give 21-acetoxy-17α-hydroxypregna-1:4:6-triene-3:11:20-trione as needles, M.P. 221 to 225° C., $[\alpha]_D+280°$ (c. 0.4 in dioxan), $\lambda_{max}$. 223 m$\mu$ (log $\epsilon$ 4.02), 256 m$\mu$ (log $\epsilon$ 3.97), and 298 m$\mu$ (log $\epsilon$ 4.06).

EXAMPLE 26

9-Fluoro-11β:17β-Dihydroxy-17α-Methylandrosta-1:4-Dien-3-one

9α-fluoro-11β:17β - dihydroxy - 17α - methylandrosta-4-en-3-one (250 mg.) (Herr et al., J. Amer. Chem. Soc., 1956, 78, 500) and 2:3-dichloro-5:6-dicyanobenzoquinone (250 mg.) in dry benzene (5 ml.) and dioxan (5 ml.) were heated under reflux for 32 hours, and the product was isolated as in Example 1. 9α-fluoro-11β:17β-dihydroxy - 17α - methylandrosta-1:4-dien-3-one crystallised from acetone/hexane (1:3) in needles, M.P. 272 to 274° C., $[\alpha]_D^{26}+55°$ (c. 0.23 in chloroform), $\lambda_{max}$. 239 m$\mu$ log $\epsilon$ 4.09 in ethanol, $\nu_{max}$. 3310, 1660, 1622 and 1601 cm.$^{-1}$ in Nujol.

EXAMPLE 27

Ethyl 3-Oxopregna-1:4:17(20)-Trien-21-oate

Ethyl 3-oxopregna-4:17(20)-dien-21-oate (250 mg.) and 2:3-dichloro-5-6-dicyanobenzoquinone (220 mg.) in dry benzene (4 ml.) were heated under reflux for 24 hours (Patel, Petrow, Royer and Stuart-Webb, J.C.S., 1952, 161) and the product was isolated as in Example 1. Ethyl 3-oxopregna-1:4:17(20)-trien-21-oate crystallised from acetone/hexane (1:6) in prisms, M.P. 132 to 133° C., $[\alpha]_D^{27}+61°$ (c. 0.29 in chloroform), $\lambda_{max}$. 228.5 m$\mu$, log $\epsilon$ 4.38 in ethanol $\nu_{max}$. 1700, 1660, 1648, 1620 and 1598 cm.$^{-1}$ in Nujol.

EXAMPLE 28

20:20-Ethylenedioxypregna-1:4-Dien-3-one

20:20-ethylenedioxypregna-4-en-3-one (200 mg.) and 2:3-dichloro-5:6-dicyanobenzoquinone (180 mg.) in dry benzene (4 ml.) were heated under reflux for 30 hours (Gut, J. Biol. Chem., 1956, 21, 1327) and the product was isolated as in Example 1. 20:20-ethylenedioxypregna-1:4-dien-3-one crystallised from aqueous methanol (80%) in flakes, M.P. 184 to 186° C., $[\alpha]_D^{22}+45°$ (c. 0.16 in chloroform), $\lambda_{max}$. 244 m$\mu$ log $\epsilon$ 4.15 in ethanol, $\nu_{max}$. 1665, 1625 and 1600 cm.$^{-1}$ in Nujol.

EXAMPLE 29

17β-Acetoxy-4-Methylandrosta-1:4-Dien-3-one 4-methyltestosterone acetate (1 g.) (Sondheimer and Mazur, J. Amer. Chem. Soc., 1957, 79, 2906) and 2:3-dichloro-5:6-dicyanobenzoquinone (860 mg.) in dry benzene (12 ml.) were heated under reflux for 36 hours and the product isolated as in Example 1. 17β-acetoxy-4-methylandrosta-1:4-dien-3-one crystallised from methanol in prisms, M.P. 175 to 177° C., $[\alpha]_D^{21}+62°$ (c. 0.24 in chloroform), $\lambda_{max}$. 245 m$\mu$ log $\epsilon$ 4.19 in ethanol.

EXAMPLE 30

Cholesta-1:4-diene-3:6-Dione

A solution of cholest-4-ene-3:6-dione (3 g.) Heilbron et al., J.C.S., 1938, 102) and 2:3-dichloro-5:6-dicyanobenzoquinone (2 g.) in dry dioxan (20 ml.) was heated under reflux for 14 hours. The product was isolated as in Example 1 and crystallised from hexane to give cholesta-1:4-diene-3:6-dione as needles, M.P. 132 to 134° C., $[\alpha]_D^{20}+90.6°$ (c. 1.06 in chloroform), $\lambda_{max}$. 251 m$\mu$, log $\epsilon$ 4.17.

EXAMPLE 31

20β-Hydroxypregna-1:4-Dien-3-one

A solution of 20β-hydroxypregn-4-en-3-one (1 g.) (Butenandt and Schmidt, Ber., 1934, 67, 2092), and 2:3-dichloro-5:6-dicyanobenzoquinone (0.75 g.) in dry dioxan (10 ml.) was heated under reflux for 10 hours. The product was isolated as in Example 1 and crystallised from aqueous methanol to give 20β-hydroxypregna-1:4-dien-3-one as needles, M.P. 192 to 194° C., $[\alpha]_D^{19}+12°$ (c. 0.85 in chloroform), $\lambda_{max}$. 244 m$\mu$ (log $\epsilon$ 4.16) and $\nu_{max}^{Nujol}$ 1665, 1620 and 1605 cm.$^{-1}$.

EXAMPLE 32

Acetonide of 16α:17α-Dihydroxypregna-1:4-Diene-3:20-Dione

A solution of the acetonide of 16α:17α-dihydroxypregn-4-ene-3:20-dione (1.3 g.) (Cooley et al., J.C.S., 1955, 4373), and 2:3-dichloro-5:6-dicyanobenzoquinone (1 g.) in dry dioxan (20 ml.) was heated under reflux for 14 hours. The product was isolated as in Example 1 and crystallised from acetone/hexane to give the acetonide of 16α:17α-dihydroxypregna-1:4-diene-3:20-dione as rods, M.P. 197 to 199° C., $[\alpha]_D^{19}+83.35°$ (c. 1.38 in chloroform), $\lambda_{max}$. 243.5 m$\mu$ log $\epsilon$ 4.14.

EXAMPLE 33

4-Chloro-17β-Propionoxyandrosta-1:4-Dien-3-one

A solution of 4-chloro-17β-propionoxyandrost-4-en-3-one (0.55 g.) (Kirk, Patel and Petrow, J.C.S., 1956, 1184) and 2:3-dichloro-5:6-dicyanobenzoquinone (0.5 g.) in dry dioxan (5 ml.) was heated under reflux for 20 hours. The product was isolated as in Example 1 and crystallised from aqueous methanol to give 4-chloro-17β-propionoxyandrosta-1:4-dien-3-one as needles, M.P. 140 to 141° C., $[\alpha]_D^{18}+75°$ (c. 1.0 in chloroform), $\lambda_{max}$. 246 m$\mu$, log $\epsilon$ 4.05.

EXAMPLE 34

17β-Acetoxy-2-Methylandrosta-1:4-Dien-3-one

A solution of 17β-acetoxy-2α-methylandrost-4-en-3-one (1 g.) (Ringold and Rosenkrantz, J. Org. Chem., 1956, 21, 1333) and 2:3-dichloro-5:6-dicyanobenzoquinone (0.8 g.) in dry dioxan (10 ml.) was heated under reflux for 11 hours. The product was isolated as in Example 1 and crystallised from aqueous methanol to give 17β-acetoxy-2-methylandrosta-1:4-dien-3-one as plates, M.P. 165 to 167° C., $[\alpha]_D^{19}+48.1°$ (c. 1.12 in chloroform), $\lambda_{max}$. 244.5 m$\mu$, log $\epsilon$ 4.17.

EXAMPLE 35

Pregna-1:4:9(11)-Triene-3:20-Dione

A solution of pregna-4:9(11)-diene-3:20-dione (0.35 g.) (Shoppee and Reichstein, Helv. Chim. Acta, 1941, 24, 351) and 2:3-dichloro-5:6-dicyanobenzoquinone (0.3 g.) in dry dioxan (5 ml.) was heated under reflux for 12 hours. The product was isolated as in Example 1 and crystallised from aqueous methanol to give pregna-1:4:9(11)-triene-3:20-dione as small plates, M.P. 124 to 126° C., $\nu_{max}^{Nujol}$ 1700, 1660, 1620 and 1600 cm.$^{-1}$

We claim:

1. A process comprising reacting a steroid compound selected from the group consisting of 3-oxo-Δ$^4$ and 3-oxo-Δ$^{4,6}$ derivatives of steroid compounds of the androstane, pregnane, stigmastane, cholestane and spirostane series with a compound selected from the group consisting of 2:3-dicyano-1:4-benzoquinone, and chlorine-substituted 2:3dicyano-1:4-benzoquinone having up to two chlorine atoms, in an organic solvent, to thereby provide the corresponding 1-dehydro compound.

2. A process as claimed in claim 1 wherein 2:3-dicyano-5:6-dichloro-1:4-benzoquinone is reacted with said steroid starting material.

3. A process as claimed in claim 1 wherein said solvent is selected from the groups consisting of benzene and dioxan.

4. A process as claimed in claim 1 wherein the reaction is carried out at a temperature between 80° C. and 110° C.

5. A process as claimed in claim 1 wherein the reaction is carried out in the presence of a catalytic quantity of p-nitrophenol.

6. The process of claim 1 wherein the first two rings of the steroid nucleus of the steroid starting material have the following structure:

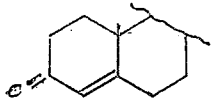

7. The process of claim 1 wherein the first two rings of the steroid nucleus of the steroid starting material have the following structure:

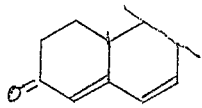

8. The process of claim 1 wherein the starting material is 17α-hydroxyprogesterone.

9. The process of claim 1 wherein the starting material is cortisone acetate.

10. The process of claim 1 wherein the starting material is 11α-hydroxypregn-4-ene-3:20-dione.

11. The process of claim 1 wherein the starting material is 9α - fluoro - 11β:17β-dihydroxy-17α-methylandrosta-4-ene-3-one.

12. The process of claim 1 wherein the starting material is the acetonide of 16α:17α-dihydroxypregn-4-ene-3:20-dione.

References Cited in the file of this patent

UNITED STATES PATENTS

| | | |
|---|---|---|
| 2,705,719 | Rubin | Apr. 5, 1955 |
| 2,793,208 | Korman et al. | May 21, 1957 |
| 2,837,464 | Nobile | June 3, 1958 |
| 2,877,239 | Agnello et al. | Mar. 10, 1959 |
| 2,880,217 | Thoma et al. | Mar. 31, 1959 |
| 2,882,282 | Agnello et al. | Apr. 14, 1959 |
| 2,883,379 | Moreland et al. | Apr. 21, 1959 |
| 2,899,447 | Gould et al. | Aug. 11, 1959 |

OTHER REFERENCES

Cooley et al.: J.C.S., vol. 80 (1955), pp. 4373–76.